Figure 1:
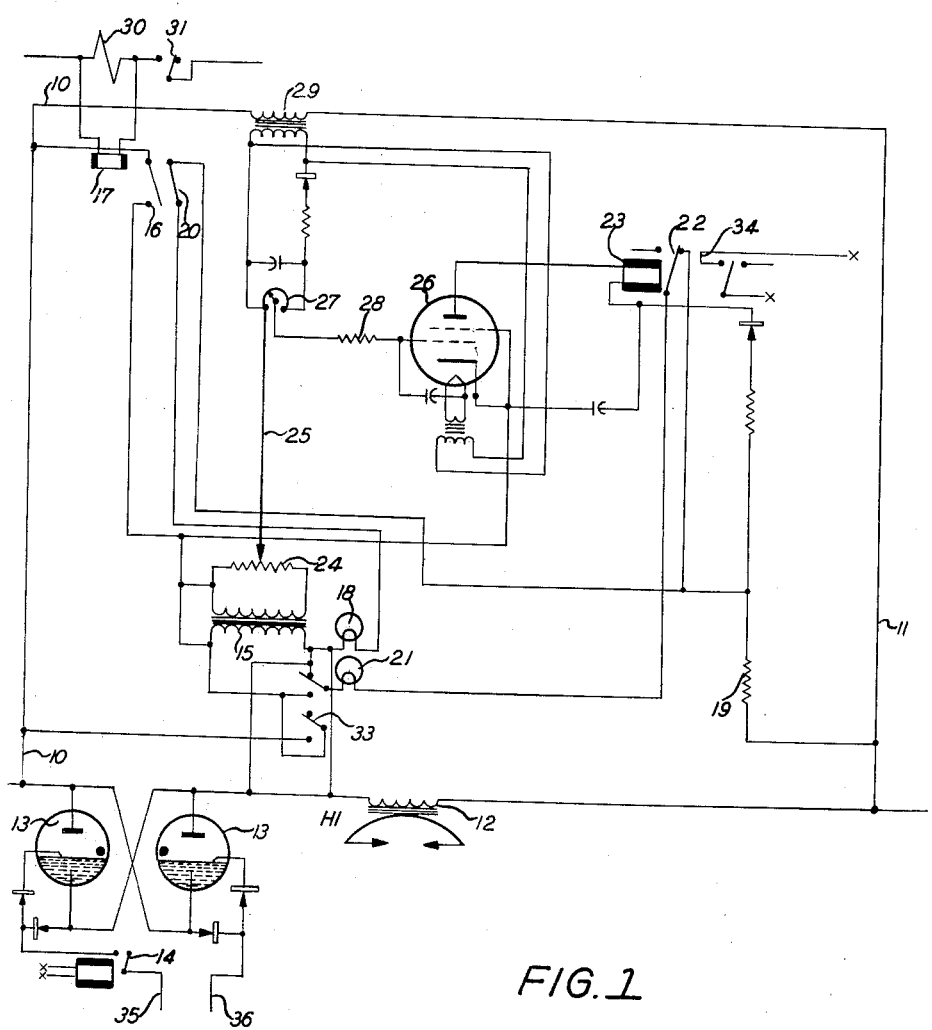

Sept. 18, 1956  J. J. CHILDS  2,763,769
RESISTANCE WELDING APPARATUS
Filed June 1, 1954

J.J. CHILDS
INVENTOR.

BY E. C. McRae
J. R. Faulkner
J. H. Oster

ATTORNEYS

United States Patent Office 2,763,769
Patented Sept. 18, 1956

2,763,769

RESISTANCE WELDING APPARATUS

John J. Childs, Detroit, Mich., assignor to Ford Motor Company, Dearborn, Mich., a corporation of Delaware Application June 1, 1954, Serial No. 433,341

2 Claims. (Cl. 219—108)

This invention is concerned with the art of resistance welding and more specifically with an apparatus for indicating the proper adjustment of resistance welder controls and an improvement in such resistance welder methods and controls. This application is a continuation in part of applications Serial No. 348,919, filed April 15, 1953, and Serial No. 353,156, filed May 5, 1953, both now abandoned.

In many industrial operations it is desirable to make a series of resistance or spot welds in a short period of time using a portable welding gun which is moved manually along the areas to be joined, thereby producing a series of welds whose spacing is a function of the speed with which the gun is moved and the time between each individual operation of the welding gun.

These resistance welds are normally made by applying a heavy alternating current to two sheets of steel by means of two opposed copper electrodes which are adapted to exert a heavy pressure upon the work. With the apparatus at rest and the electrodes open and de-energized, the initial operation comprises the closing of the electrodes and the application of pressure thereby to the work. This is called the squeeze time and to permit possible deformation of the work pieces under such pressure the squeeze time must be a finite interval. This movement of the electrodes and the application of pressure is usually accomplished by a compressed air cylinder controlled by a solenoid valve.

At the conclusion of the squeeze time when the work has been deformed and the opposite surfaces brought as close together as possible the welding circuit is energized and the flow of current from one electrode through the work to the other electrode starts the actual heating and welding period. To avoid undesirable transients in the welding transformer it is imperative that the actual initiation of the welding cycle take place when the voltage to be applied to the primary of the welding transformer is well removed from the zero portion of the cycle. The application of the welding current intensely heats the work and at least to some extent fuses the adjacent surfaces. When this has been accomplished the welding current is discontinued while the pressure of the electrodes against the work is maintained to cause upsetting of the work and to "follow" the work as it cools. This period after the interruption of the welding current is known as holding time.

To secure the maximum speed from this type of welding operation, it is essential that none of the various operations be extended beyond that required for satisfactory operation. This invention provides a method and apparatus for readily adjusting the mechanism controlling these operations.

Figure 2:
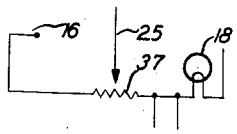
Figure 3:
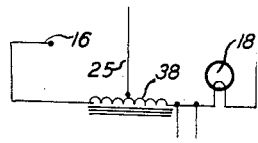
Figure 4:
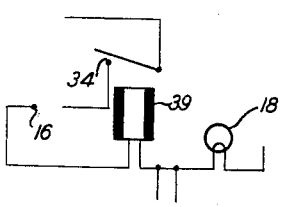

This invention is probably best understood by reference to the drawings in which Figure 1 is a circuit diagram of an apparatus for indicating the proper adjustment and controlling a resistance welder, and Figure 2 is a circuit diagram of an alternative form of a portion of Figure 1, and Figure 3 is a circuit diagram of a further alternative form of a portion of Figure 1, and Figure 4 is a third alternative of the same portion of Figure 1.

Reverting to Figure 1 of the drawing, the energy for the welding operation is obtained from line 10 and line 11 which is conveniently the ordinary 220 or 440 volt, 60 cycle power supply. The actual welding energy is obtained from welding transformer 12 the primary of which is energized directly from line 11 and from line 10 through ignitrons 13, the firing of which is controlled by welding current control relay 14. Conduits 35 and 36 are connected to a timing or control mechanism for additionally controlling the main welding current. The primary of transformer 15 shunts ignitrons 13 and is controlled by the contact points 16 of relay 17. Pilot light 18 is connected to line 10 through the primary of transformer 15 and to line 11 through resistance 19 and is controlled by contact points 20 of relay 17. It is to be noted that contact points 16 are normally opened and contact points 20 are normally closed. Pilot light 21 is also connected to line 10 through the primary of transformer 15 and to line 11 through resistance 19. Pilot light 21 is controlled by contact points 22 which are operated by and a part of relay 23. A double pole, double throw switch 33 is also inserted in this circuit for a purpose which will become apparent. The secondary of transformer 15 is connected across potentiometer 24 and impresses its potential upon line 25. Line 25 leads to the grid of thyratron 26 through potentiometer 27 and resistance 28.

Transformer 29 has its primary directly energized from line 10 and line 11 and through the filter circuit shown provides a bias for the control grid of thyratron 26. Air solenoid valve 30 controls the flow of air to the cylinder used for applying the pressure to the work. Air solenoid valve 30 and relay 17 are simultaneously energized by the closing of contact points 31 which are actuated by the timing mechanism which is not shown.

The normal operation of this apparatus may be outlined as follows. When the contact points 31 are closed by the timer, solenoid valve 30 admits compressed air to the electrode operating cylinder and also energizes the armature of relay 17 which closes normally open contact points 16 and opens normally closed contact points 20. A study of this circuit will show that the primary of transformer 15 and the primary of main welding transformer 12 are in series across power lines 10 and 11. Because of the much higher reactance of transformer 15 the greater part of the potential existing between lines 10 and 11 will appear across the terminals of the primary of transformer 15. Potentiometers 24 and 27 are so adjusted that with this state of affairs the bias upon the control grid of thyrtron 26 is sufficient to render this tube nonconducting as long as a portion of the potential between line 10 and 11 is dissipated in the primary of welding transformer 12. This condition will obtain only as long as the secondary of welding transformer 12 is open.

The closure of the secondary of welding transformer 12 occasioned by firm contact being established between the two welding electrodes through the work will result in the substantial elimination of the potential across the primary of transformer 12. Accordingly, substantially the entire potential existing between lines 10 and 11 will be impressed upon the primary of transformer 15. This increase in potential is sufficient when reflected through potentiometer 24, potentiometer 27 and resistance 28 to destroy the negative bias of thyratron 26 and to permit this tube to become conducting. The plate current of thyratron 26 flows through the armature of relay 23 and causes contact points 22 to move from their normally closed to an open position.

The normal operation of indicating pilot lights 18 and 21 is thought to be apparent from the above description. When the external timer initiates the welding procedure contact points 31 close and simultaneously energize relay 17 and air valve solenoid 30. The contact points 16 of relay 17 close and contact points 20 of relay 17 open. Due to the division of the line potential between the primary of welding transformer 12 and transformer 15, thyratron 26 is unable to overcome the D. C. bias provided through potentiometer 27 and remains nonconducting. When the timer mechanism closes welding current control relay 14 and fires ignitrons 13, transformer 15 is short circuited and the entire line potential appears across the primary of welding transformer 12. It will be observed that pilot light 21 is normally shunted across the primary of this transformer. However, normally closed points 22 of relay 23 are in series in this pilot light circuit. In normal operation of the circuit the welding electrodes will have closed tightly upon the work and effectively short circuited the secondary of welding transformer 12 prior to the energizing of the welding transformer 12 primary from power lines 10 and 11. The short circuiting of the secondary of welding transformer 12 will destroy the potential across its primary and transfer the entire line potential to the primary of transformer 15. When this happens the direct current bias on thyratron 26 will be lowered sufficiently to permit this tube to conduct. The plate current of thyratron 26 flows through the armature of relay 23 and opens normally closed contact points 22 and hence prevents pilot light 21 from lighting. Thus it will be seen that pilot light 21 will only glow when the primary of the welding transformer is energized prior to its secondary being solidly short circuited through the welding electrodes and the work.

It will be noted that pilot light 18 is also shunted across the primary of welding transformer 12 and is controlled by normally closed contact points 20 of relay 17. This light is employed to indicate the occurrence of so-called negative holding time. In rapidly operating welding guns it is often possible to deenergize the solenoid controlling the compressed air which closes the welding points before the welding transformer is deenergized and to rely upon the time required for the escape of the confined air and the inertia of the moving parts to provide sufficient holding time. Contact points 20 of relay 17 are normally closed and will cause pilot light 18 to glow whenever the welding transformer is energized and the air controlling solenoid is deenergized. Thus it is an indication of the occurrence of this so-called negative holding time.

Double pole, double throw switch 33 has been provided to make possible a quick check of the welding transformer and the associated cables for partial or complete shorts. If double pole, double throw switch 33 is moved from the position shown in the drawing to the other position the pilot light 21 should glow if no shorts exist in the apparatus. The existence of any shorts will destroy the voltage across the primary of welding transformer 12 and cause thyratron 26 to conduct. This operates relay 23 and opens contact points 22 and extinguishes pilot light 21 thereby indicating a short circuit.

Advantage may be taken of the above circuit by adding contact points 34 which are operated by relay 23. The closing of contact points 34 is employed to control the firing of ignitrons 13 and hence to energize welding transformer 12. In this way no arbitrary time period need be interposed between the energizing of the air valve solenoid and the firing of ignitrons 13. Instead these ignitrons may be fired instantly when the secondary of welding transformer 12 has been solidly short circuited and is ready to produce a satisfactory weld.

This invention has been described as employing a transformer (15) shunted by the ignitrons. However, the invention is by no means so limited and the transformer 15 may be replaced by impedance of other forms such as reactances, resistances, voltage sensitive relays, capacitors, or judicious combination of these electrical elements.

In Figure 2 a modification of the circuit depicted in Figure 1 is shown in which transformer 15 is replaced by resistance or potentiometer 37.

In Figure 3 transformer 15 of Figure 1 is shown replaced by reactance 38 tapped to place upon line 25 the proper potential.

In Figure 4 transformer 15 of Figure 1 is shown replaced by a voltage sensitive relay 39 containing contact points 34'. This voltage sensitive relay will close at full line potential but not at line potential minus the reactive voltage drop of welding transformer 12 with the secondary open. When a voltage sensitive relay 39 is employed, its points 34' may well be substituted for points 34 of relay 23 with the elimination of the intermediate electrical apparatus.

While a welder controlled as described in this specification is capable of firing the ignitrons instantly after the secondary of the welding transformer has been solidly short circuited, superior results will be obtained if a timer is interposed in the control circuit to delay the firing of the ignitrons for a short time after the secondary has been solidly short circuited to permit any necessary deformation of the metal before welding actually begins. A time delay of ½ to 6 cycles is usually sufficient although under exceptional circumstances a longer interval may be necessary.

The action of thyratron 26 has been described as passing through a relay (23). However, this is by way of example only and the discharge of thyratron 26 may be employed to initiate the welding cycle through any of the many control devices well known in the art.

I claim as my invention:

1. In a resistance welding apparatus, a welding transformer and a second transformer connected in series across a source of alternating current, means shunting said second transformer to energize said welding transformer for welding, an air valve solenoid for closing the welding points, a relay connected in parallel with said solenoid and having a pair of normally open contacts and a pair of normally closed contacts, and a pilot light shunted across the primary of the welding transformer, said normally open contacts being connected between the end of the primary of the second transformer remote from the welding transformer and the line and said normally closed points being in series with the pilot light whereby said pilot light will glow if the welding transformer is energized while said air valve solenoid is deenergized.

2. In a resistance welding apparatus, a welding transformer and a second transformer connected in series across a source of alternating current, means shunting said second transformer to energize said welding transformer for welding, an air valve solenoid for closing the welding points, a thyratron arranged to be nonconducting when the potential across the primary of said second transformer is substantially below line voltage and to be conducting when said potential approaches line voltage, a relay having its armature in series with the plate circuit of said thyratron and having a pair of normally closed contact points, and a second pair of contact points, and a pilot light shunted across the primary of the welding transformer and controlled by said normally closed contact points whereby said pilot light will glow if the welding transformer is energized prior to the short circuiting of its secondary by the work, said second pair of contacts being arranged to cause the energizing of the welding transformer when the thyratron becomes conducting.

References Cited in the file of this patent
UNITED STATES PATENTS

| | | |
|---|---|---|
| 1,935,413 | Prince | Nov. 14, 1933 |
| 2,112,716 | Smith | Mar. 29, 1938 |
| 2,303,500 | Roby et al. | Dec. 1, 1942 |
| 2,573,094 | Cox et al. | Oct. 31, 1951 |